United States Patent [19]
Yamauchi et al.

[11] 3,897,403
[45] July 29, 1975

[54] METHOD OF PRODUCING SYNTHETIC CIS-1,4-POLYISOPRENE RUBBER HAVING HIGH GREEN STRENGTH

[75] Inventors: Junnosuke Yamauchi; Takayuki Okamura; Shobu Minatono; Kazuhisa Yamauchi, all of Ibaragi, Japan

[73] Assignee: Kuraray Co., Ltd., Kurashiki, Japan

[22] Filed: Nov. 30, 1973

[21] Appl. No.: 420,632

[30] Foreign Application Priority Data
Dec. 2, 1972  Japan.............................. 47-120960

[52] U.S. Cl............................................. 260/78.4 D
[51] Int. Cl......................... C08d 5/02; C08f 27/00
[58] Field of Search............................... 260/78.4 D

[56] References Cited
UNITED STATES PATENTS

| | | |
|---|---|---|
| 3,567,691 | 3/1971 | Van Breen et al............. 260/78.4 D |
| 3,651,025 | 3/1972 | Bean et al...................... 260/78.4 D |
| 3,778,418 | 12/1973 | Nakayama..................... 260/78.4 D |

*Primary Examiner*—Joseph L. Schofer
*Assistant Examiner*—John Kight
*Attorney, Agent, or Firm*—Bacon & Thomas

[57] ABSTRACT

A reaction between synthetic cis-1,4-polyisoprene rubber and maleic anhydride in solution is carried out in the presence of at least 10 moles of isoprene monomer per mole of maleic anhydride using a free radical initiator in an amount which is both from 0.02 to 10 moles per mole of maleic anhydride and 0.1 to 15 millimoles per 100 g of the rubber, to produce a modified polyisoprene rubber having an improved green strength with the suppression of gel formation during the reaction.

11 Claims, No Drawings

3,897,403

METHOD OF PRODUCING SYNTHETIC CIS-1,4-POLYISOPRENE RUBBER HAVING HIGH GREEN STRENGTH

BACKGROUND OF THE INVENTION

1. Field of the Invention

This invention relates to a method of producing improved synthetic cis-1,4-polyisoprene rubber compositions having both high green strength compared to that of the starting rubber and good processability due to the small content of gel.

2. Description of the Prior Art

Cis-1,4-polyisoprene rubber (hereinafter often abbreviated as IR), which has almost the same chemical structure with that of natural rubber, can be used as rubber material for general purposes, because IR has excellent processability such as good workability on a roll, low mill shrinkage and superior extrudability. The unvulcanized IR composition has similar properties to those of natural rubber. However, one of the drawbacks of IR is its relatively low green strength (strength properties in an unvulcanized state) and hence bagging and deformation sometimes occurs in the unvulcanizate during calendering, molding and other processing stepsp during the manufacture of shaped rubber articles therefrom.

To improve the green strength of IR it has been proposed that IR be reacted with maleic anhydride in the presence of free radical initiators in solution. However, according to said maleinization reaction, a considerable amount of gel is liable to form during the reaction resulting in reaction operation difficulties and poor processability of the reaction product.

SUMMARY OF THE INVENTION

The object of the present invention is therefore to provide a method of producing polyisoprene rubber having an improved green strength by reacting cis-1,4-polyisoprene rubber with maleic anhydride without the disadvantages above mentioned.

Surprisingly, it has been discovered that the formation of gel during the reaction of IR with maleic anhydride in solution can be suppressed by the presence of isoprene monomer in the reaction mixture. However, according to this method, a sufficient increase in green strength may not be attained even if a large amount of maleic anhydride is reacted with IR. The reason is not always clear but it may be that the reaction mechanism of IR with maleic anhydride in the presence of isoprene and that in the absence of isoprene are different from each other. Further investigation on this problem has revealed that by the strict prescription of the amount of free radical initiator used in relation to the amounts of maleic anhydride and IR, gel formation is suppressed and a product having sufficiently high green strength can be obtained.

Therefore, according to the present invention, polyisoprene rubber having improved green strength and good processability can be manufactured with suppressed formation of gel by reacting IR with maleic anhydride in an inert solvent, in the presence of isoprene monomer in an amount of more than 10 moles per mole of maleic anhydride with the use of a free radical initiator in a proportion of 0.02 to 10 moles per mole of maleic anhydride and in a proportion of 0.1 to 15 millimoles per 100 g of IR

DESCRIPTION OF THE PREFERRED EMBODIMENTS

In the present invention gel is defined as that part of the rubber which is insoluble in benzene and which can be filtered off with a glass filter having a micro pore size of 20 to 30$\mu$ in diameter.

When the amount of free radical initiator used in the reaction of IR with maleic anhydride in solution is less than 0.02 mole per mole of maleic anhydride and further is at the same time less than 0.1 millimole per 100 g of IR, a product having sufficiently high green strength cannot be obtained. Further, when the amount of free radical initiator used is more than 10 moles per mole of maleic anhydride and at the same time is more than 15 millimoles per 100 g of IR, the object of the present invention cannot be attained because gel formation is very large during the reaction resulting in a product of poor processability, even if the isoprene monomer is added to the reaction system in an amount of more than 10 moles per mole of maleic anhydride. In summary, therefore, it is important in the present invention that a controlled amount of isoprene monomer should be added to the reaction mixture and further the amount of free radical initiator should be strictly prescribed relative to both the amount of maleic anhydride and that of starting IR. It is desirable to perform the reaction in the presence of an amount of isoprene monomer which is at least 15 moles per mole of maleic anhydride, using a free radical initiator in an amount which is both from 0.05 to 5 moles per mole of maleic anhydride and from 0.5 to 10 millimoles per 100 g of IR.

The free radical initiator employed in the present invention may be any of the conventional ones, without limitation, used in free radical polymerization of vinyl monomers including, as exemplary only, peroxides and hydroperoxides, such as benzoyl peroxide, lauroyl peroxide, diisopropyl peroxy dicarbonate, t-butyl peroxy pivalate, t-butyl peroxy neodecanoate, cumene hydroperoxide, t-butyl hydroperoxide, and the like; azoic initiators, such as 2,2'-azobis isobutylonitrile, 2,2'-azobis (4-methoxy-2, 4-dimethyl valeronitrile), 2,2'-azobis (2,4-dimethyl valeronitrile), and the like and redox initiators such as hydrogen peroxideferrous salt combinations, cumene hydroperoxide-amine combinations and the like. Generally, however, any free radical initiator used in vinyl monomer polymerization is operable in the present invention.

According to the present invention, the amount of isoprene monomer is required to be adjusted to an optimum amount, though the range of said amount is less critical than that of radical initiator. When the amount of isoprene monomer used is less than 10 moles per mole of maleic anhydride, large amounts of gel are formed during the reaction. The properties of the obtained modified IR are hardly damaged by using an excess amount of isoprene monomer in the reaction. However, such brings about loss of isoprene monomer due to side reactions such as dimerization and increases the amount of isoprene monomer to be recovered after the reaction resulting in uneconomical process. Therefore, it is recommended that the maximum amount of isoprene monomer employed be not greater than 500 moles per mole of maleic anhydride, although greater amounts can be used and still realize the same results. In other words, this maximum is only preferred and is not a critical limitation. It is only necessary that it be present in an amount of at least 10 moles per mole of maleic anhydride.

At the time of the maleinization reaction conducted in the presence of the isoprene monomer, side reactions may take place such as a Diels-Alder's reaction between the maleic anhydride and the isoprene while the desired reaction between maleic anhydride and the IR molecule is occurring. In order to suppress said side reactions and facilitate the intended reaction effectively, it is recommended, although not necessary, that the reaction be conducted at a temperature below 150°C., preferably below 100°C. Since a lower rate of reaction is obtained at a lower reaction temperature, the reaction should be carried out at above 20°C., preferably above 40°C. However, temperatures greater than the maximum and lower than the minimum can be employed depending on the results desired. The above limits are only preferred, not critical limitations.

In the present invention, the amount of maleic anhydride used should be selected depending on the desired green strength of the product. Generally, it is suitable to use from 0.1 to 10 parts, preferably 0.2 to 5 parts, by weight of maleic anhydride per 100 parts by weight of IR. When maleic anhydride is used in an amount less than 0.1 weight part per 100 weight parts of IR, the increase in the green strength of the IR is small. While with the use of maleic anhydride in an amount of more than 10 weight parts per 100 weight parts of IR, the reaction in accordance with the present invention sometimes produces a large amount of gel in the product and also an economical disadvantage will be involved. However, these limits can be exceeded as they are preferred and not critical limitations.

In view of the fact that high green strength and good processability are desired, it is preferred to adjust the bound maleic anhydride content in the modified IR to approximately 0.05 to 1.0 mole per 100 recurring units of isoprene monomer in the IR polymer. The content of maleic anhydride in the modified IR can be controlled by changing the reaction temperature, the reaction time, the amount of free radical initiator employed and the amount of maleic anhydride within the ranges of the reaction conditions mentioned above.

Generally speaking, the bound maleic anhydride content is increased by increasing the reaction temperature, the reaction time and the amounts of free radical initiator and maleic anhydride present during reaction. Those skilled in the art can make appropriate adjustments in these parameters, with a minimum amount of experimentation and using known techniques, to provide an IR polymer with any amount of bound maleic anhydride within the above preferred range.

In the present invention the bound maleic anhydride content in the product can be determined by dissolving the reaction product in benzene and performing a titration using sodium hydroxide in a mixed solution of methanol-benzene (1:4, by vol.) with bromthymol blue or phenol phthalein as an indicator. Generally speaking, the more the amount of maleic anhydride to be reacted with IR, the higher the green strength of the product is. However, in the method of the present invention according to which the reaction is performed in the presence of isoprene monomer, it should be noted that if the amount of free radical initiator is less than the range indicated above, low green strength is obtained even in a product containing a large amount of maleic anhydride. This fact suggests that the mechanism of the addition reaction of maleic anhydride to IR in the presence of isoprene monomer differs from the reaction mechanism of that in the absence of isoprene monomer. For example, when the reaction is carried out using a small amount of free radical initiator in the presence of maleic anhydride used in an amount of 50 times as large as that of the free radical initiator by mole, a product having a sufficiently high green strength cannot be obtained, although the bound maleic anhydride content in the polymer may be increased.

The method of the present invention is most applicable to cis-1,4-polyisoprene rubber having a cis-1,4 content of more than 90%, preferably more than 95%. It has been well-known that such cis-1,4-polyisoprene rubber having a high content of cis-1, 4 configuration can be manufactured by solution polymerization using anionic catalysts or Ziegler-type catalysts.

In the reaction according to the present invention, a solvent for IR is used as a reaction medium in order to facilitate the uniform dispersion of the isoprene monomer, maleic anhydride and initiator into the IR and to control the bound maleic anhydride content in the modified IR.

The solvents which may be employed in the present reaction are aromatic or saturated aliphatic hydrocarbons which dissolve IR and are inert to the reaction, such as benzene, toluene, xylene, n-hexane, n-heptane, butane and isopentane, and the like, and mixtures thereof, and if necessary these solvents may be used under increased pressure. Mixtures of the above solvents with a small amount of a nonsolvent, for example, ketones, such as acetone and saturated aliphatic alcohols such as methanol may also be used.

The concentration of IR in the reaction solution is normally in the range of 0.1 to 15%, preferably 1 to 10% by weight, based on the weight of the solution. When the IR concentration is as high as 20%, the solution becomes so viscous that stirring during the reaction and handling after the reaction are very difficult, and in addition gellation sometimes occurs during the reaction. However, the IR concentration may be varied from the above normal range and good results still can be achieved, since it is not absolutely necessary that the above IR concentration range be strictly adhered to.

The reaction time should be selected dependent on the reaction temperature, the amount of free radical initiator and the amount of maleic anhydride but generally, 0.5 to 4 hours of reaction time may be required. The reaction is preferably carried out under an atmosphere of an inert gas such as nitrogen. The reaction can be terminated by any conventional technique employed in free radical reactions, such as by adding a free radical polymerization inhibitor, lowering the reaction temperature or pouring the reaction mixture into an excess amount of a non-solvent for the reaction product.

The modified IR obtained according to the present invention is of nearly the same processability as that of the starting IR and its green strength is remarkably increased with a small content of bound maleic anhydride.

The modified IR produced by the invention can be mixed adequately with conventional compounding ingredients such as zinc oxide, stearic acid, sulfur, vulcanization accelerators and fillers, for example, carbon black, silica and clay in the same way as ordinary IR is compounded, to give unvulcanized compositions. Such unvulcanized compositions exhibit highly improved green strengths compared to modified IR by itself. Those skilled in the art can select appropriate compounding ingredients to obtain these unvulcanized compositions, as is conventional.

Decreased formation of gel due to the presence of isoprene monomer during the reaction in the present invention contributes to the maintaining of workability on the roll, calendering properties and extrudability of the modified IR much the same as those properties of the starting IR.

Any type of reaction vessel can be employed as long as it permits contact between the isoprene monomer, free radical initiator, maleic anhydride and starting IR. The reaction may be conducted in a batch, semi-continuous or continuous manner. A semi-continuous process is one where all of some of the reactants are added initially to the reaction system and the remaining reactants are added continuously over the course of the reaction. In a continuous process, of course, all reactants are continuously added during reaction. Continuous operation can be readily employed due to the small amount of gel formation during the reaction.

In the present invention, the term "maleic anhydride" to be reacted with IR is meant to include maleic anhydride derivatives. Accordingly the modified IR produced by the present invention includes the following types. The first type of modified IR is an adduct obtained by reacting IR with maleic anhydride per se, according to the process described above.

A second type of modified IR which can be prepared by the present invention is a product obtained by converting the bound maleic anhydride groups in the polymer (produced by the above process) into the free acid form, the metal salt form, the mono- or di-ester form, the amide form or the imide form, by reacting the adduct obtained in the first group described with, for example, alcohols such as methanol, ethanol or n-butanol or amines such as ammonia, n-butyl amine, iso-butyl amino, allyl amine, di-n-butyl amine, monoethanol amine, diethanol amine, triethyl amine, tri-isopropanol amine or pyridine, if necessary in the presence of a catalyst such as p-toluene sulfonic acid. Thus, the maleic anhydride group may be converted into a maleic acid ester, such as the alkyl esters having from 1 to 8 carbon atoms. Likewise, the maleic anhydride group may be converted into the free acid form or the acid salt form (such as a metal salt) by hydrolyzing the acid anhydride group with either an acid or an alkali. Either one or both of the carboxylic groups of the maleic anhydride group may be converted into the corresponding ester, amide or imide, or the free acid or acid salt form. The conditions of reaction are not critical, and those conditions which are generally used for reacting an acid anhydride with the aforementioned materials to produce the above derivatives can be employed, with those skilled in the art being aware of such techniques.

A third form of modified IR which may be produced by the present invention comprises adducts obtained by reacting a maleic anhydride derivative (instead of maleic anhydride per se) with IR, the maleic anhydride derivative including, for example, monoor di-esters of maleic acid (such as the alkyl esters having from 1 to 8 carbon atoms), maleic acid amides or maleic acid imides. This form of modified IR can be produced by reacting the maleic acid esters, maleic acid amides, or maleimides with IR under the same reaction conditions as those discussed above in the reaction between IR and maleic anhydride per se.

A fourth type of modified IR which may be produced by the present invention is a polymer containing both maleic anhydride and one or more of the aforementioned maleic anhydride derivatives in the molecular chain thereof. These polymers may be produced by incompletely reacting an adduct of IR with maleic anhydride per se with, for example, an alcohol or an amine to incompletely convert the maleic anhydride group into, for example, an ester, an amide or an imide, or likewise the free acid form thereof or the acid salt form thereof.

A fifth type of modified IR which may be produced by the present invention comprises mixtures of the above four types, such as a mixture of the first adduct with any of the second, third or fourth types of material.

Therefore, the terminology modified IR includes all of the above types of materials, all being capable of being produced by the process of the present invention.

By way of further illustration, the following examples are given, which are not intended to be limiting in any manner.

EXAMPLE 1

Synthetic cis-1,4-polyisoprene rubber, which was prepared using a Ziegler-type catalyst, having a cis-1,4 content of 98% and an intrinsic viscosity of 3.6 dl/g (hereafter, indicated as $[\eta]$) measured in toluene at 30°C. and 5.5% of benzene-in-soluble material, filtered off with a glass filter having a micro pore size of 20 to 30$\mu$, was employed as the starting IR.

A solution consisting of 1L of n-hexane and 50 g of said IR was placed in a reaction vessel, and to the solution was added 25 g of isoprene monomer, 0.50 g of maleic anhydride (isoprene monomer: maleic anhydride = 72:1, by mole) and 0.15 g of diisopropyl peroxydicarbonate (IPP) (IPP/maleic anhydride = 0.1/1, by mole and IPP/IR - 1.46 millimole/100 g). The reaction was carried out at a temperature of 60°C. for 1.5 hours.

The contents of the vessel were then poured into acetone to precipitate white rubber, which was then washed with acetone to remove unreacted maleic anhydride, solvent and others, and dried.

The reaction product was dissolved in benzene and the bound maleic anhydride content in the product rubber was determined by titration with a solution of sodium hydroxide in a mixed solvent of methanol and benzene. The measured content of maleic anhydride was 0.25 mole per 100 recurring units of isoprene monomer in IR. The benzene-insoluble part of the reaction product was 12.8%, which was found to be only a very slightly increased value from the starting IR.

Using the so-obtained modified IR, a rubber composition containing carbon black was prepared according to the following compounding formulation by means of mill mixing. During the compounding process, there was observed no problem with the processability of the rubber which exhibited good workability on the roll and small mill shrinkage. A composition derived from the starting IR was also prepared for comparison. The green strengths of the obtained compositions were measured and the results are shown in the following Table 1. As is seen from the Table 1, the modified IR composition had a highly improved green strength.

Compounding Formulation

| Polymer | 100 | (parts by weight) |
|---|---|---|
| HAF Carbon Black | 45 | |
| Zinc Oxide | 5 | |
| Stearic Acid | 3 | |
| Sulfur | 2 | |
| Accelerator[1] | 1 | |
| Antioxidant[2] | 1 | |

[1]N-oxydiethylene-2-benzothiazole sulphenamide
[2]2,2'-methylene bis-(4-methyl-6-t-butyl phenol)

TABLE 1

Green strength and mill shrinkage of the compositions (Mooney viscosity, $ML_{1+4}50$ at 100°C.)

| Polymer | Modified IR | Starting IR |
|---|---|---|
| 300% modulus (kg/cm$^2$) | 3.5 | 0.8 |
| Tensile strength (kg/cm$^2$) | 8.5 | 0.6 |
| Elongation (%) | 650 | 510 |
| Mill shrinkage (%) | 20 | 19 |

REFERENCE EXAMPLE 1

For comparison the same procedure as above mentioned was repeated except no isoprene monomer was used in the maleinization reaction.

REFERENCE EXAMPLE 2

The same procedure as above mentioned was repeated using the same amount of isoprene monomer except that the amount of maleic anhydride was increased to 7.5 g (isoprene monomer: maleic anhydride = 4.8:1, by mole ratio) and the amount of IPP was decreased to 0.0075 g (IPP/maleic anhydride = 0.005 by mole ratio, IPP/IR - 0.073 millimole/100g).

After the reaction, the content of bound maleic anhydride and the gel content in the obtained modified IR, and the green strength and the mill shrinkage of the modified rubber composition loaded with carbon black were measured and are shown in the following Table 2.

TABLE 2

Table 2

| | Reference Example 1 | Reference Example 2 |
|---|---|---|
| Bound maleic anhydride content (mole/100 of isoprene recurring unit) | 0.34 | 0.24 |
| Benzene-insoluble gel (%) | 48 | 7.5 |
| 300% modulus (kg/cm$^2$) | 3.5 | 1.5 |
| Tensile strength (kg/cm$^2$) | 9.0 | 2.1 |
| Elongation (%) | 630 | 900 |
| Mill shrinkage (%) | 6 | 20 |
| Mooney viscosity of the composition (100°C.) | 65 | — |

It is apparent from Example 1 and Reference Examples 1 and 2 that gel formation during the reaction is suppressed according to the present invention and mill shrinkage of the product is low resulting in good processability of the modified IR of the invention. Further it can be recognized that a product having a high green strength cannot be obtained unless the amount of the free radical initiator (i.e., IPP) falls within the above range in the reaction in the presence of isoprene monomer even though maleic anhydride reacts with IR. In other words, modified IR having a small gel content, good processability, superior green strength and other well-balanced properties can be obtained by the method of the present invention.

EXAMPLE 2

The same procedure as in Example 1 was repeated except that 0.20 g of t-butyl peroxy-neodecanoate (ND) was used in place of diisopropyl peroxy dicarbonate (ND/maleic anhydride = 0.11/1, by mole ratio, ND/IR = 1.64 millimoles/100 g). Modified IR having a bound maleic anhydride content of 0.23 mole per 100 recurring units of isoprene monomer and having 10.5% of benzeneinsoluble parts was obtained. The tensile strength and the mill shrinkage of the unvulcanizate (i.e., the unvulcanized composition) of the modified IR containing carbon black prepared by the same procedure as in Example 1 were 8.4 kg/cm$^2$ and 19% (Mooney viscosity $ML_{1+4}$ (100°C.): 65). The stress at 300% elongation of the unvulcanized stock of the rubber alone was 1.4 kg/cm$^2$, which is considerably superior to the value of 0.3 kg/cm$^2$ for the stress at 300% elongation of the starting rubber (Mooney viscosity $ML_{1+4}$ at 100°C.: 65).

EXAMPLE 3

The same procedure as in Example 1 was repeated except that 0.3 g of lauroyl peroxide (LPO) was used in place of diisopropyl peroxydicarbonate (LPO/maleic anhydride = 0.096, by mole ratio, LPO/IR = 1.5 millimole/100g) and the reaction temperature was 70°C. The formed modified IR had 0.19 mole of bound maleic anhydride per 100 isoprene recurring units in the IR polymer and 11.5% of benzene-insoluble gel.

The unvulcanizate containing carbon black prepared by the same manner as in Example 1 had a tensile strength of 8.3 kg/cm$^2$ and a mill shrinkage of 20% (Mooney viscosity: 65) which showed a high green strength and good processability.

EXAMPLE 4

68 g of IR (98% of cis-1,4 content and 4.3 dl/g of [$\eta$], prepared with the use of a Ziegler-type catalyst) was placed in a reaction vessel, to which was added 900 ml of n-butane to dissolve said IR. To the solution, 13.6 g of isoprene monomer, 0.68 g of maleic anhydride (isoprene monomer/maleic anhydride = 28.4, by mole ratio) and 0.068 g of di-2-ethyl hexyl peroxy dicarbonate (OPP) (OPP/maleic anhydride = 0.028, by mole ratio; OPP/IR = 0.29 millimole/100g) were added. The reaction was carried out for 1 hour at 60°C. After the reaction was completed, the entire contents of the vessel were poured into an excess of acetone, and the precipitated polymer was washed well with acetone and dried. The resulting product had 0.21 mole of bound maleic anhydride per 100 isoprene recurring units and 20.5% of benzene-insoluble gel.

The unvulcanized composition of said modified IR containing carbon black which was prepared by the same manner as in Example 1 had a tensile strength of 7.6 kg/cm$^2$ and a mill shrinkage of 18% (Mooney viscosity: 60), while the unvulcanizate of the starting IR containing carbon black prepared by the same manner as above had a tensile strength of only 0.6 kg/cm$^2$ and a mill shrinkage of 17%. It is recognized from the above result that the modified IR according to the present invention has a highly improved green strength as compared with the starting IR and the processability of the modified IR is as good as that of the starting IR.

EXAMPLE 5

The same procedure as in Example 4 was repeated using 0.10 g of 2,2'-azo-bis-(4-methoxy-2,4-dimethyl valeronitrile (VN), (VN/maleic anhydride = 0.047, by mole ratio, VN/IR = 0.48 millimole/100 g) in place of the OPP. The resulting product had 0.16 mole of bound maleic anhydride per 100 isoprene recurring units and 18% benzene-insoluble gel part.

The unvulcanizate of the so-obtained modified IR containing carbon black prepared by the same manner and recipe as in Example 1 had the following properties to show good processability and improved green strength:

| | |
|---|---|
| Tensile strength | 7.3 kg/cm$^2$ |
| Mill shrinkage | 18% |
| (Mooney viscosity: | 62) |

While the invention has been described with reference to preferred embodiments thereof, those skilled in the art will realize that various changes, modifications and substitutions may be made therein without departing from the spirit and scope of the invention. It is the intention, therefore, that the invention be limited only by the appended claims.

What is claimed is:

1. A method of producing synthetic cis-1,4-polyisoprene rubber having an improved green strength, which comprises reacting synthetic cis-1,4-polyisoprene with maleic anhydride in, as an inert reaction medium, an aromatic hydrocarbon solvent or a saturated aliphatic hydrocarbon solvent for said polyisoprene in the presence of isoprene monomer in an amount of at least 10 moles per mole of maleic anhydride and also in thet presence of a free radical initiator in an amount which is both from 0.02 to 10 moles per mole of maleic anhydride and from 0.1 to 15 millimoles per 100 g of said polyisoprene rubber.

2. The method of claim 1, wherein the maleic anhydride is present in an amount of from 0.1 to 10 parts by weight per 100 parts by weight of the rubber.

3. The method of claim 1, wherein the reaction is carried out until synthetic cis-1,4-polyisoprene having a bound maleic anhydride content of 0.05 to 1.0 mole per 100 recurring units of isoprene monomer is obtained as a reaction product.

4. The method of claim 1, wherein the isoprene monomer is present in an amount of at least 15 moles per mole of maleic anhydride and the free radical initiator is present in an amount which is both from 0.05 to 5 moles per mole of maleic anhydride and 0.5 to 10 millimoles per 100 g of the rubber.

5. The method of claim 1, wherein the free radical initiator is one capable of initiating free radical polymerization of a vinyl monomer.

6. The method of claim 5, wherein the initiator is selected from the group consisting of peroxides, hydroperoxides, azoic free radical initiators and redox free radical initiators.

7. The method of claim 1, wherein the isoprene monomer is present in an amount of not greater than 500 moles per mole of maleic anhydride.

8. The method of claim 1, wherein the temperature of reaction is from 20°C. to 150°c.

9. The method of claim 1, wherein said polyisoprene rubber has a cis-1,4 content of greater than 90%.

10. The method of claim 1 wherein the concentration of said polyisoprene rubber in said reaction medium is from 0.1 to 15% by weight, based on the weight of the entire reaction mixture.

11. The method of claim 3, wherein the reaction time is from 0.5 to 4 hours.

* * * * *